(No Model.)

G. C. FLAGG.
DRAFT EQUALIZER.

No. 336,708. Patented Feb. 23, 1886.

WITNESSES:
Otto Beyer
C. Sedgwick

INVENTOR:
G. C. Flagg
BY Munn & Co.
ATTORNEYS.

United States Patent Office.

GEORGE C. FLAGG, OF COLUMBUS, ILLINOIS.

DRAFT-EQUALIZER.

SPECIFICATION forming part of Letters Patent No. 336,708, dated February 23, 1886.

Application filed August 26, 1885. Serial No. 175,372. (No model.)

*To all whom it may concern:*

Be it known that I, GEORGE C. FLAGG, of Columbus, in the county of Adams and State of Illinois, have invented a new and Improved Draft-Equalizer, of which the following is a full, clear, and exact description.

My invention is an improvement in draft-equalizers for three horses, and it is more particularly an improvement upon the equalizer forming the subject of Letters Patent No 181,707.

The features of novelty are as hereinafter described and claimed.

Figure 1:
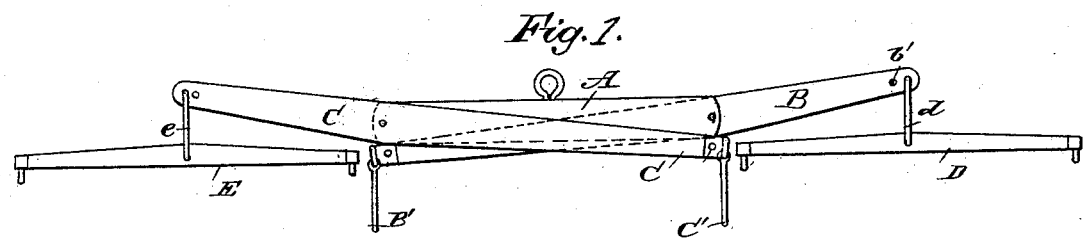
Figure 2:

In accompanying drawings, Figure 1 is a plan view of my improved equalizer, the double-trees being moved out of line to illustrate the relative arrangement of parts; and Fig. 2 is a front view of the same.

The equalizer is composed of the following parts: The main bar or triple-tree A, the double-trees B, pivoted at $b$ $c$ to the respective ends of bar A, and the single-trees D E, attached to the double-trees. One of the latter is pivoted to the under side and the other to the upper side of the triple-tree A.

I make no claim to novelty in respect to the combination or arrangement of these parts.

I will now describe the features of novelty which embody my invention. The middle horse is attached to the inner ends of the double-trees B C by means of long hooks B' C'— that is to say, the said hooks are made of a length equal to the distance of the cockeyes of the single-trees D E from the outer ends of the double-trees, so that an even hitch of the tugs or traces of all three horses across the equalizer is secured. Another advantage is that the long hooks B' C' prevent contact of the traces with the triple-tree A, which would be inevitable if the traces were attached to cockeyes in the usual way. The single-trees D E are attached to the double-trees by shorter hooks $d$, which are, however, of sufficient length to allow the single-trees due "play" or freedom of movement. The inner end, $b^3$, of double-tree B is turned upward and the corresponding end, $c^3$, of the other double-tree, C, is turned downward over the ends of the triple-tree A, as shown in Fig. 2, thus bringing the middle hook-bars, to which the middle horse is attached, in line with each other and the triple-tree. Without this arrangement it is obvious the draft on the shoulders of the middle horse would be unequally applied and the equalizer subjected to greater torsional strain.

Having thus described my invention, what I claim as new is—

In a three-horse equalizer, the combination, with the triple-tree A, of the double-trees B and C, pivoted to the under and upper sides thereof, as specified, and having their respective inner ends turned downward and upward over the contiguous ends of said triple-tree, as and for the purpose specified.

GEORGE C. FLAGG.

Witnesses:
WILLIAM BEUTEL,
M. G. POLLOCK.